US012734809B2

(12) United States Patent
Shinano

(10) Patent No.: US 12,734,809 B2
(45) Date of Patent: Sep. 15, 2026

(54) CLEANING DEVICE FOR LIQUID JET HEAD AND LIQUID JET RECORDING APPARATUS

(71) Applicant: SII Printek Inc., Chiba (JP)

(72) Inventor: Yosuke Shinano, Chiba (JP)

(73) Assignee: SII PRINTEK INC., Chiba (JP)

( * ) Notice: Subject to any disclaimer, the term of this patent is extended or adjusted under 35 U.S.C. 154(b) by 114 days.

(21) Appl. No.: 18/887,802

(22) Filed: Sep. 17, 2024

(65) Prior Publication Data

US 2025/0100285 A1 Mar. 27, 2025

(30) Foreign Application Priority Data

Sep. 21, 2023 (JP) ................................ 2023-154124

(51) Int. Cl.
*B41J 2/165* (2006.01)

(52) U.S. Cl.
CPC ....... *B41J 2/16552* (2013.01); *B41J 2/16508* (2013.01); *B41J 2002/16558* (2013.01); *B41J 2002/16594* (2013.01)

(58) Field of Classification Search
CPC ................ B41J 2/16552; B41J 2/16508; B41J 2002/16558; B41J 2002/16594
See application file for complete search history.

(56) References Cited

FOREIGN PATENT DOCUMENTS

| | | | | |
|---|---|---|---|---|
| CN | 111660672 B | * | 7/2022 | .......... B41J 2/16538 |
| JP | 2012-143947 A | | 8/2012 | |

* cited by examiner

*Primary Examiner* — Justin Seo
(74) *Attorney, Agent, or Firm* — Crowell & Moring LLP

(57) ABSTRACT

An alignment with a liquid jet head can easily be achieved, and surfaces of a jet plate and a guard member and an inside of an opening part of the guard member can be cleaned without injuring the jet plate even when side surfaces of the liquid jet head are not exposed, and a part of the jet plate is not exposed by the guard member. A cleaning device for an inkjet head includes a holder, and the holder includes a jet section which jets a cleaning liquid toward at least one of a nozzle plate and a nozzle guard, a contact part which makes contact with a surface of the nozzle guard provided with the opening part, and a protruding part which is inserted into the opening part in a non-contact state with the nozzle plate, and which guides the holder along a longitudinal direction of the opening part.

14 Claims, 15 Drawing Sheets

CLEANING DEVICE FOR LIQUID JET HEAD AND LIQUID JET RECORDING APPARATUS

RELATED APPLICATIONS

This application claims priority to Japanese Patent application No. JP2023-154124 filed on Sep. 21, 2023, the entire content of which is incorporated herein by reference.

BACKGROUND OF THE INVENTION

1. Field of the Invention

The present disclosure relates to a cleaning device for a liquid jet head, and a liquid jet recording apparatus.

2. Description of the Related Art

In JP2012-143947A, there are disclosed a liquid wiping unit for a liquid jet head which ejects a liquid from a nozzle to form an image or a character on a recording target medium, or a thin film material, and a liquid jet apparatus using the liquid wiping unit. The liquid wiping unit is provided with a recessed part which is installed in an end portion of a substrate, and has a contact surface to have contact with a liquid ejection unit at an upper end of the recessed part, a suction path which is housed inside the substrate, and opens on a bottom surface of the recessed part, an absorber which absorbs the liquid, and is housed in the recessed part so that an upper surface thereof protrudes upward from the contact surface, and a guide part which is installed in an end portion of the substrate so as to protrude upward from the contact surface, and guides the absorber when the absorber slides on the liquid ejection unit, and thus, absorbs and wipes the liquid remaining on the liquid ejection unit.

Such a liquid jet head as described above may cause deterioration in jet accuracy in some cases due to a deformation or a breakage of a jet plate caused by a contact or the like with a base material or the like as a printing target.

Therefore, there also exists a liquid jet head having a guard member for protecting the jet plate. Such a liquid jet head having the guard member prevents the contact with the base material or the like on the one hand, and at the same time, also causes to decrease a cleaning efficiency of a wipe unit such as a scraper used for cleaning on the other hand. Therefore, a cleaning device suitable for the liquid jet head is necessary.

For example, when using the liquid wiping unit in the related art described above, and when the liquid jet head is assembled to the liquid jet recording apparatus to thereby prevent a part of a side surface and a lower surface of the guard member from being exposed, since the guide part has a shape of clamping the side surfaces of the guard member, the whole of the contact surface and the absorber fail to have contact with the liquid jet head, and therefore, it is unachievable to perform appropriate cleaning. Further, for example, when the liquid to be used in the liquid jet head dries quickly, ink which adheres to the liquid ejection unit fixes, and the ink thus fixed cannot be removed in some cases only by suction achieved by moving the absorber closer to the liquid ejection unit.

The present disclosure is made in view of the problem described above, and has an object of making it possible to easily achieve alignment with the liquid jet head, and cleaning surfaces of the jet plate and the guard member and an inside of the opening of the guard member without injuring the jet plate, even when the side surfaces of the liquid jet head are not exposed, and a part of the jet plate is not exposed by the guard member.

SUMMARY OF THE INVENTION (1) A cleaning device for a liquid jet head according to an aspect of the present disclosure includes a holder which is configured to perform cleaning by moving relatively to a liquid jet head including a jet plate provided with a plurality of jet holes configured to jet a liquid, and a guard member which is configured to cover the jet plate, and is provided with an opening part shaped like an elongated hole configured to expose the plurality of jet holes, wherein the holder includes a jet section configured to jet a cleaning liquid toward at least one of the jet plate and the guard member, a contact part configured to make contact with a surface of the guard member provided with the opening part, and a protruding part which is inserted into the opening part in a non-contact state to the jet plate, and is configured to guide the holder along a longitudinal direction of the opening part.

According to the cleaning device for the liquid jet head related to the present aspect, by the contact part making contact with the surface of the guard member, it is possible to achieve the alignment in the first direction (the jet direction, the gravitational direction). Further, by the protruding part being inserted into the opening part of the guard member, alignment in a second direction (the transverse direction of the opening part) crossing the first direction can be achieved. Thus, even in a situation in which the jet plate of the liquid jet head cannot visually be checked, and when a manual work is performed, the alignment of the holder can easily be achieved.

Further, by moving the holder thus aligned in a third direction (the longitudinal direction of the opening part) crossing the first direction and the second direction, and jetting the cleaning liquid, it is possible to clean the surfaces of the jet plate and the guard member, and the inside of the opening part of the guard member. It should be noted that the protruding part is inserted in the opening part in a non-contact state with respect to the jet plate, and therefore, there is no chance to injure the jet plate.

(2) In the cleaning device for the liquid jet head according to the aspect (1), the holder may include a recessed part configured to receive the cleaning liquid jetted by the jet section.

In this case, the cleaning liquid can be prevented from dripping off from the holder.

(3) In the cleaning device for the liquid jet head according to the aspect (2), the holder may include a suction part disposed in the recessed part.

In this case, the cleaning liquid can be prevented from spilling over the recessed part.

(4) In the cleaning device for the liquid jet head according to the aspect (3), the holder may include a wall part which is erected from a bottom wall of the recessed part at a height no higher than an upper end of the recessed part, and which forms a space part surrounding the suction part.

In this case, it becomes easy to provide negative pressure around the suction part, and thus, it is possible to increase the efficiency of suctioning the cleaning liquid.

(5) In the cleaning device for the liquid jet head according to the aspect (3) or (4), the suction part may be disposed at both sides across the jet section in the longitudinal direction of the opening part.

In this case, the cleaning liquid which runs through the opening part of the guard member can be prevented from dripping off from the both sides in the longitudinal direction.

(6) In the cleaning device for the liquid jet head according to any one of the aspects (2) through (5), the contact part may be formed to have a convex shape along an opening circumference edge portion of the recessed part.

In this case, even in the state in which the side surfaces of the inkjet head are not exposed, and a part of the guard member is recessed so as to form a shape concave upward, since the contact part having a convex shape can make contact with the surface of the guard member, the alignment of the holder can easily be performed, and the cleaning on the liquid jet head becomes possible. Further, since the upper end position of the recessed part rises due to the contact part, it is possible to prevent the cleaning liquid from spilling over the recessed part.

(7) In the cleaning device for the liquid jet head according to any one of the aspects (2) through (5), a plurality of the protruding parts may be disposed at intervals in the longitudinal direction of the opening part.

In this case, by the plurality of protruding parts making contact with the side walls in the transverse direction of the opening parts in which the plurality of protruding parts is inserted, a rotation around an axis extending in the first direction (the jet direction, the gravitational direction) of the holder can be regulated.

(8) In the cleaning device for the liquid jet head according to any one of the aspects (1) through (6), the jet section may be disposed between the protruding parts adjacent to each other in the longitudinal direction of the opening part.

In this case, it is possible to dispose the jet section using a space in a valley portion between the plurality of protruding parts, and further, it becomes easy to jet the cleaning liquid to an aimed portion due to a rotation regulation of the holder.

(9) In the cleaning device for the liquid jet head according to any one of the aspects (1) through (8), the jet section may have a plurality of cleaning liquid jet holes, and at least one of the cleaning liquid jet holes may be opposed to a jet area formed of the plurality of jet holes in a first state in which the protruding part has contact with a side surface at one side in a transverse direction of the opening part, a second state in which the protruding part has contact with a side surface at another side in the transverse direction of the opening part, and a third state in which the protruding part has contact with none of the side surfaces at both sides in the transverse direction of the opening part.

In this case, even when a gap in the transverse direction exists between the protruding part and the opening part, it is possible to always make the jet section (the cleaning liquid jet holes) opposed to the jet area.

(10) In the cleaning device for the liquid jet head according to any one of the aspects (1) through (9), the jet section may have a plurality of cleaning liquid jet holes, and at least one of the cleaning liquid jet holes may be located at a first opposed position opposed to a jet hole located in an end portion at one side in the longitudinal direction of the opening part out of the plurality of jet holes, or one side in the longitudinal direction of the opening part with respect to the first opposed position in a fourth state in which the protruding part has contact with a side surface at one side in the longitudinal direction of the opening part, and a second opposed position opposed to a jet hole located in an end portion at another side in the longitudinal direction of the opening part out of the plurality of jet holes, or another side in the longitudinal direction of the opening part with respect to the second opposed position in a fifth state in which the protruding part has contact with a side surface at another side in the longitudinal direction of the opening part.

In this case, by moving the holder from the state in which the protruding part is aligned with the side surface at either one of the sides in the longitudinal direction of the opening part toward the side surface at the other side in the longitudinal direction of the opening part, it is possible to clean all of the jet holes.

(11) In the cleaning device for the liquid jet head according to any one of the aspects (1) through (10), the protruding part may include a depressed part formed on an upper end surface of the protruding part, and a protruding part cleaning liquid jet hole formed in the depressed part.

In this case, by accumulating the cleaning liquid in the depressed part formed on the upper end surface of the protruding part to form a pool, and pressing a portion of the cleaning liquid raised by the surface tension against the jet plate, it is possible to softly clean the jet plate.

(12) In the cleaning device for the liquid jet head according to any one of the aspects (1) through (11), a plurality of the opening parts may be formed at intervals in a transverse direction of the opening parts, and the protruding parts may be disposed as a pair at such an interval that the protruding parts are inserted into two opening parts formed at a unique interval out of the plurality of opening parts.

In this case, even when a plurality of opening parts are provided to the guard member, the alignment posture of the holder with respect to the liquid jet head is uniquely set, and it is possible to prevent the holder from being engaged with the liquid jet head at an unintended posture. Thus, it is possible to clean all of the opening parts of the guard member by the engagement and the contact with the holder as long as the holder is made symmetrically in the longitudinal direction of the opening part of the guard member, and the opening surface of the guard member is symmetric in the transverse direction of the guard member (the direction in which the nozzle arrays are arranged) when the liquid jet head and the holder are engaged with each other.

(13) In the cleaning device for the liquid jet head according to the aspect (12), the protruding parts may be disposed as a pair at such an interval that the protruding parts are inserted into two opening parts located in both end portions in the transverse direction of the opening parts out of the plurality of opening parts.

In this case, the alignment posture of the holder with respect to the liquid jet head is uniquely set with ease, and it is possible to prevent the holder from being engaged with the liquid jet head at an unintended posture. Thus, it is possible to clean all of the opening parts of the guard member by the engagement and the contact with the holder as long as the holder is made symmetrically in the longitudinal direction of the opening part of the guard member, and the opening surface of the guard member is symmetric in the transverse direction of the guard member (the direction in which the nozzle arrays are arranged) when the liquid jet head and the holder are engaged with each other.

(14) A liquid jet recording apparatus according to an aspect of the present disclosure includes the cleaning device for the liquid jet head according to any one of the aspects (1) through (13).

In this case, an alignment with the liquid jet head can easily be achieved, and surfaces of the jet plate and the guard member and an inside of the opening part of the guard member can be cleaned without injuring the jet plate even when the side surfaces of the liquid jet head are not exposed, and a part of the jet plate is not exposed by the guard member.

According to an aspect of the present disclosure described above, the alignment with the liquid jet head can easily be achieved, and the surfaces of the jet plate and the guard member and the inside of the opening part of the guard member can be cleaned without injuring the jet plate even when the side surfaces of the liquid jet head are not exposed, and a part of the jet plate is not exposed by the guard member.

DETAILED DESCRIPTION OF THE PREFERRED EMBODIMENTS

An embodiment according to the present disclosure will hereinafter be described with reference to the drawings. It should be noted that in the following description, an inkjet head installed in an inkjet printer (a liquid jet recording apparatus) is illustrated as a liquid jet head.

Figure 1:
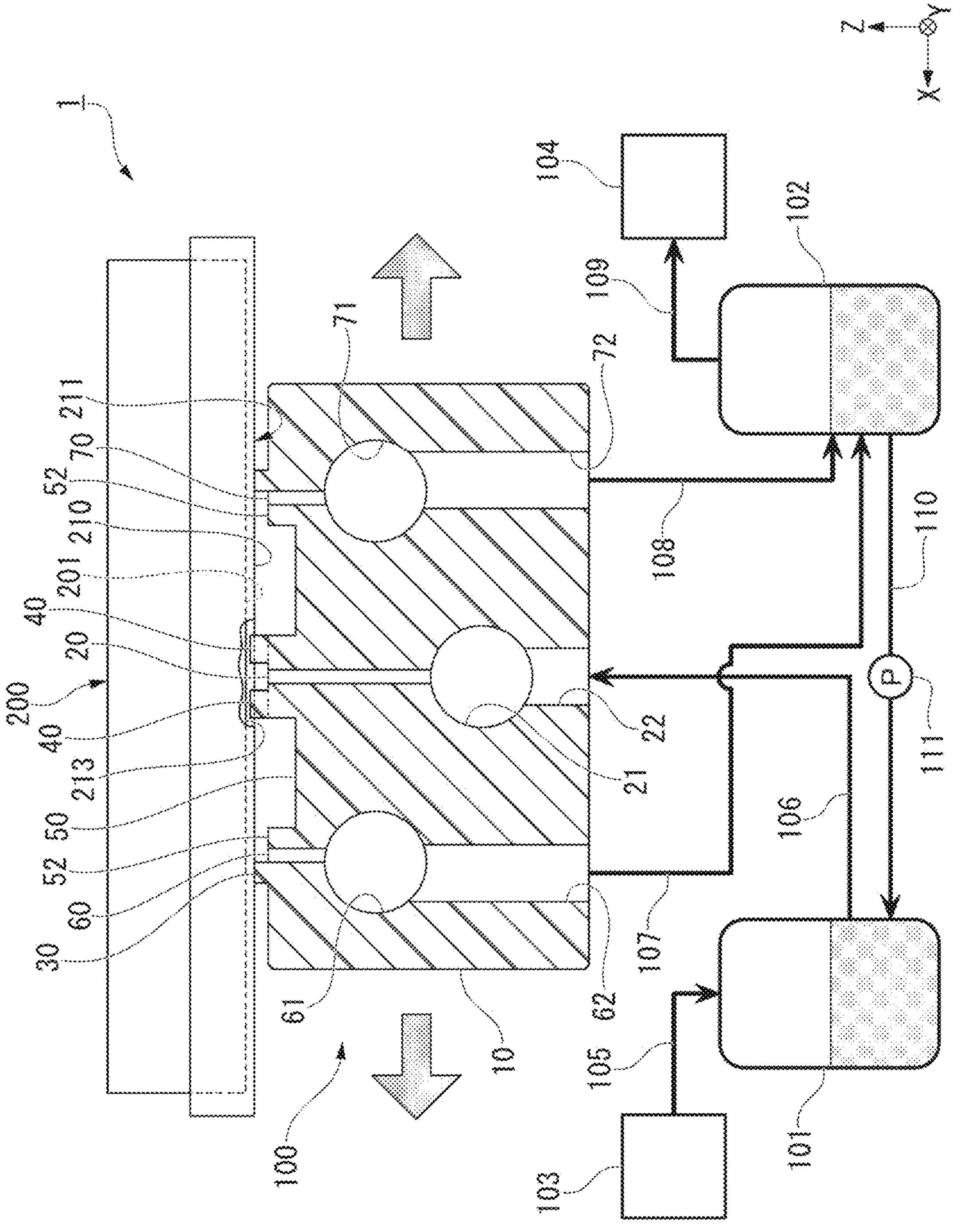
FIG. 1 is a configuration diagram of an inkjet printer according to an embodiment.
Figure 2:
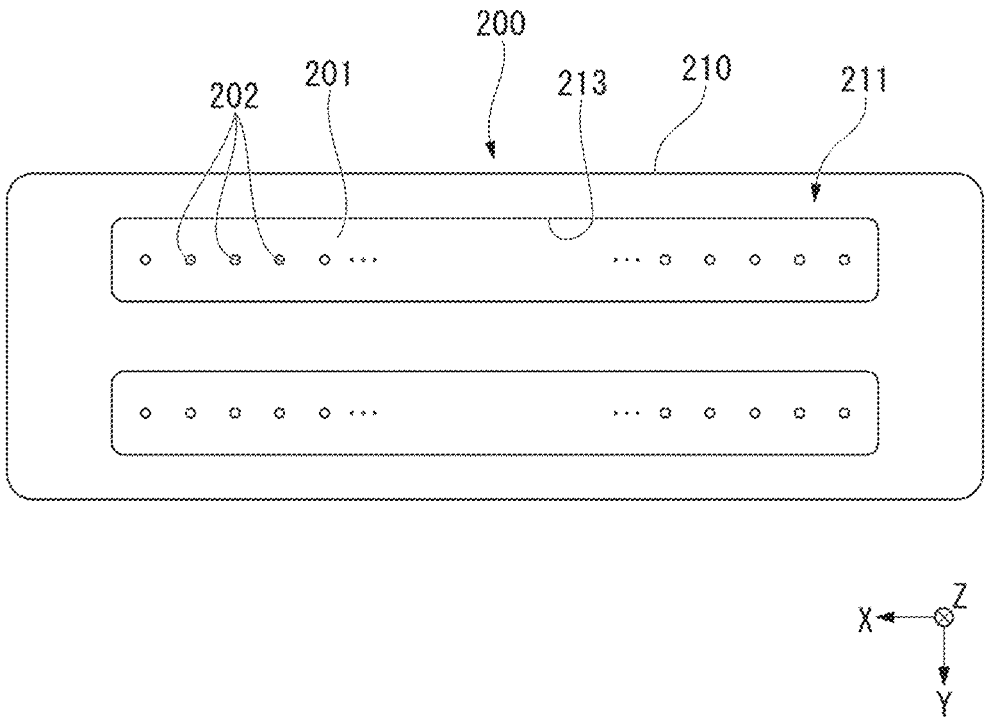
FIG. 2 is a schematic bottom view of the inkjet head according to the embodiment.

FIG. 1 is a configuration diagram of an inkjet printer 1 according to the embodiment. FIG. 2 is a schematic bottom view of the inkjet head 200 according to the embodiment.

As shown in FIG. 1, the inkjet printer 1 is provided with the inkjet head 200 (a liquid jet head) for jetting ink (a liquid).

As shown in FIG. 2, the inkjet head 200 is provided with a nozzle plate 201 (a jet plate) provided with a plurality of nozzle holes 202 (jet holes) for ejecting the ink, and a nozzle guard 210 (a guard member) which covers the nozzle plate 201, and is provided with opening parts 213 for exposing the plurality of nozzle holes 202.

The nozzle plate 201 is, for example, a plate like member bonded to a bottom surface of the inkjet head 200. The nozzle plate 201 is formed of a single layer structure, a laminated structure, or the like made of, for example, a resin material (polyimide or the like), a metal material (SUS or the like), or glass. The nozzle holes 202 are arranged at a predetermined pitch in the nozzle plate 201 to form nozzle arrays.

It should be noted that in the following description, an XYZ Cartesian coordinate system is defined, and positional relationships between the members will be explained with reference to the XYZ Cartesian coordinate system in some cases. An X-axis direction is a direction in which the nozzle arrays described above extend. Further, the X-axis direction is also a longitudinal direction of the opening part 213 of the nozzle guard 210. A Y-axis direction is a direction parallel to a plate surface of the nozzle plate 201 perpendicular to the X-axis direction. Further, the Y-axis direction is also a transverse direction of the opening part 213 of the nozzle guard 210. A Z-axis direction is a direction perpendicular to the nozzle plate 201.

The side at which the nozzle plate 201 of the inkjet head 200 is attached is referred to as a lower side or −Z side, and the side opposite to the side at which the nozzle plate 201 of the inkjet head 200 is attached is referred to as an upper side or +Z side in some cases for the sake of convenience of explanation. It should be noted that the Z-axis direction is not required to be the gravitational direction.

As shown in FIG. 2, the nozzle holes 202 form two nozzle arrays at an interval in the Y-axis direction. The nozzle plate 201 is bonded to an actuator plate not shown and provided with ejection channels and non-ejection channels to form a head chip for ejecting the ink.

In this head chip, in order to eject the ink, a voltage is applied between electrodes provided to drive walls of the ejection channel to cause the drive walls to make a thickness-shear deformation. Thus, due to a change in inner volume of the ejection channel, the ink in the ejection channel is ejected through the nozzle hole 202. It should be noted that an ejection system of the liquid is not limited to the electromechanical transduction system described above, and it is possible to adopt a charge control system, a pressure vibration system, an electrothermal transduction system, an electrostatic suction system, and so on.

The charge control system is for providing a charge to a material with a charge electrode to eject the material from a nozzle while controlling a flight direction of the material with a deflection electrode. Further, the pressure vibration system is for applying super high pressure to a material to eject the material toward a nozzle tip, and when a control voltage is not applied, the material goes straight to be ejected from the nozzle, and when the control voltage is applied, an electrostatic repelling force is generated between the materials, and the material flies in all directions to be prevented from being ejected from the nozzle.

Further, the electrothermal transduction system is for rapidly vaporizing a material with a heater provided in a space retaining the material to generate a bubble, to eject the material located in the space with the pressure of the bubble. The electrostatic suction system is for applying minute pressure to a space retaining a material to form a meniscus of the material in the nozzle, applying an electrostatic attractive force in this state, and then pulling the material out. Further, besides the above, it is possible to adopt technologies such as a system using a viscosity alteration of a fluid due to an electric field, or a system of flying a material with a discharge spark.

The nozzle guard 210 is formed by applying a press work on a plate member made of, for example, SUS. The nozzle guard 210 is formed like a plate covering a lower surface (a principal surface) of the nozzle plate 201. The nozzle guard 210 has a guard surface 211 which covers the lower surface of the nozzle plate 201.

In a portion opposed to the nozzle hole 202 of the guard surface 211 of the nozzle guard 210, there is formed the opening parts 213 penetrating the nozzle guard 210 in the Z-axis direction. The opening parts 213 are each formed like a slit (an elongated hole having a substantially rectangular shape in a bottom view) extending in the X-axis direction along the nozzle array formed of the nozzle holes 202. The nozzle holes 202 are exposed outside via the opening parts 213 of the nozzle guard 210. The nozzle plate 201 is arranged at a position retracted toward the +Z side from the guard surface 211 of the nozzle guard 210.

Then, a configuration of the cleaning device 100 suitable for the cleaning of the inkjet head 200 having the configuration described above will be described.

As shown in FIG. 1, the cleaning device 100 is provided with a holder 10 (a main body part) which moves relatively to the inkjet head 200 to thereby perform the cleaning. The holder 10 is provided with a jet section 20 for jetting a cleaning liquid, a contact part 30 having contact with a surface (the guard surface 211) of the nozzle guard 210, protruding parts 40 for guiding the holder 10 along the longitudinal direction of the opening part 213, recessed parts 50 for receiving the cleaning liquid, and suction parts 60, 70 for suctioning the cleaning liquid received in the recessed parts 50.

Inside the holder 10, there are formed a jet section chamber 21 communicated with the jet section 20, and suction part chambers 61, 71 communicated with the suction parts 60, 70. The cleaning device 100 is provided with a cleaning liquid supply tank 101 coupled to the jet section chamber 21, a cleaning liquid collection tank 102 coupled to the suction part chambers 61, 71.

A pressurizing device 103 is coupled to the cleaning liquid supply tank 101 via a first pipe 105. The pressurizing device 103 generates, for example, a compressed gas obtained by compressing outside air, and supplies the compressed gas to the cleaning liquid supply tank 101 via the first pipe 105. It should be noted that it is preferable to provide a regulator to the first pipe 105.

The cleaning liquid supply tank 101 retains the cleaning liquid. As the cleaning liquid, there can be illustrated water, a solvent for dissolving the fixed ink, and so on. To the cleaning liquid supply tank 101, there is coupled a second pipe 106. The second pipe 106 is coupled to a coupling hole 22 provided to the bottom part of the jet section chamber 21. Specifically, when pressurizing the inside of the cleaning liquid supply tank 101 with the pressurizing device 103, the cleaning liquid in the cleaning liquid supply tank 101 is supplied to the jet section chamber 21 via the second pipe 106.

A depressurizing device 104 is coupled to the cleaning liquid collection tank 102 via a third pipe 109. The depressurizing device 104 discharges the air in the cleaning liquid collection tank 102 to the outside via the third pipe 109. Besides the third pipe 109, a fourth pipe 107, a fifth pipe 108, and a sixth pipe 110 are coupled to the cleaning liquid collection tank 102. The fourth pipe 107 is coupled to a coupling hole 62 provided to a bottom part of the suction part chamber 61.

The fifth pipe 108 is coupled to a coupling hole 72 provided to a bottom part of the suction part chamber 71. In other words, when depressurizing the inside of the cleaning liquid collection tank 102 with the depressurizing device 104, it is possible to set the inside of the suction part chambers 61, 71 to a negative pressure state, and it is possible to collect the cleaning liquid retained in each of the chambers in the cleaning liquid collection tank 102 via the fourth pipe 107 and the fifth pipe 108.

The sixth pipe 110 is coupled to the cleaning liquid supply tank 101. The sixth pipe 110 is provided with a tube pump 111. The tube pump 111 returns the cleaning liquid collected in the cleaning liquid collection tank 102 to the cleaning liquid supply tank 101. Thus, it is possible to reuse the cleaning liquid. It should be noted that when the cleaning liquid thus collected is very dirty, it is not required to return the cleaning liquid to the cleaning liquid supply tank 101.

Figure 3:
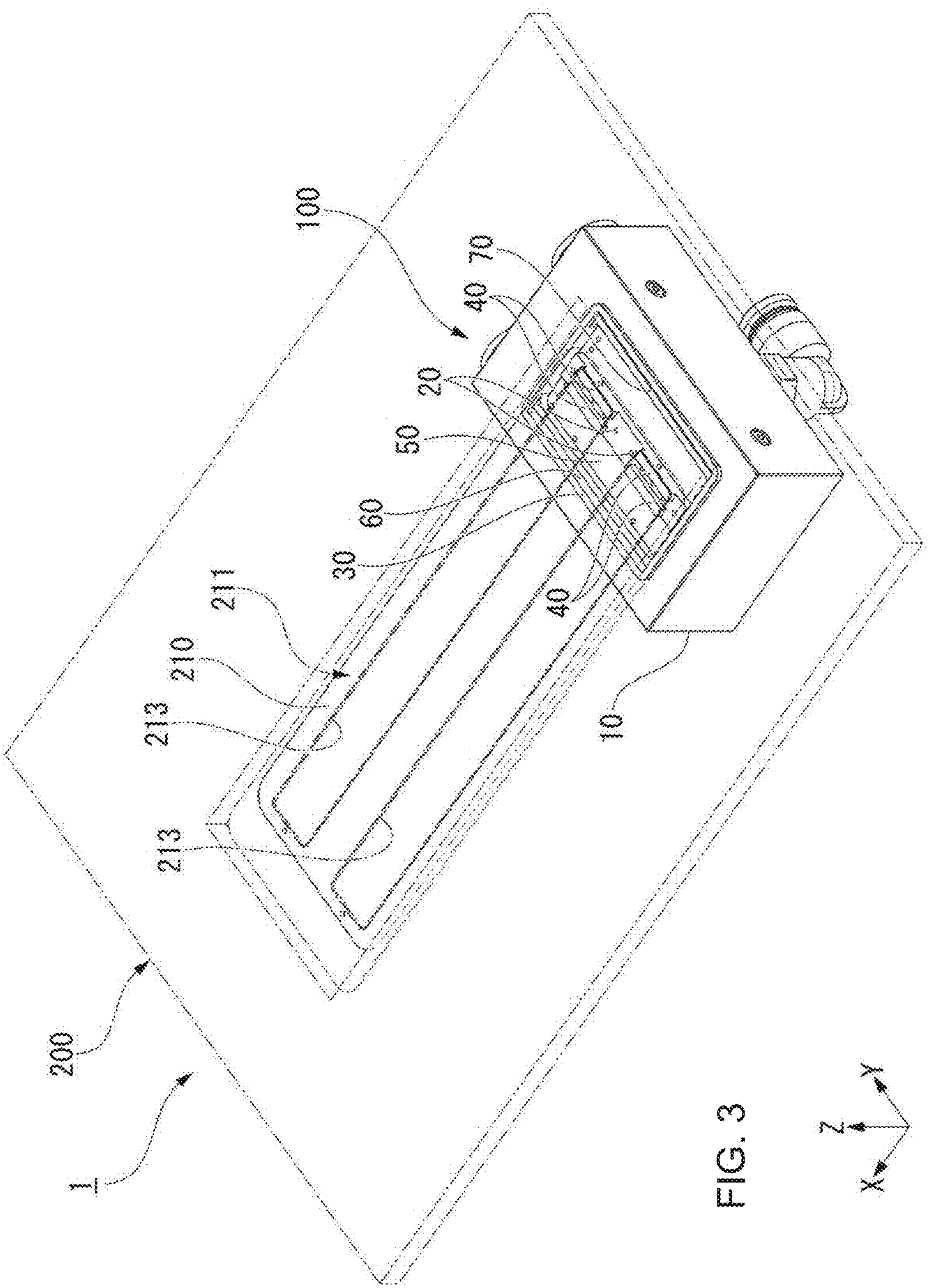
FIG. 3 is a perspective view of a cleaning device according to the embodiment.
Figure 4:
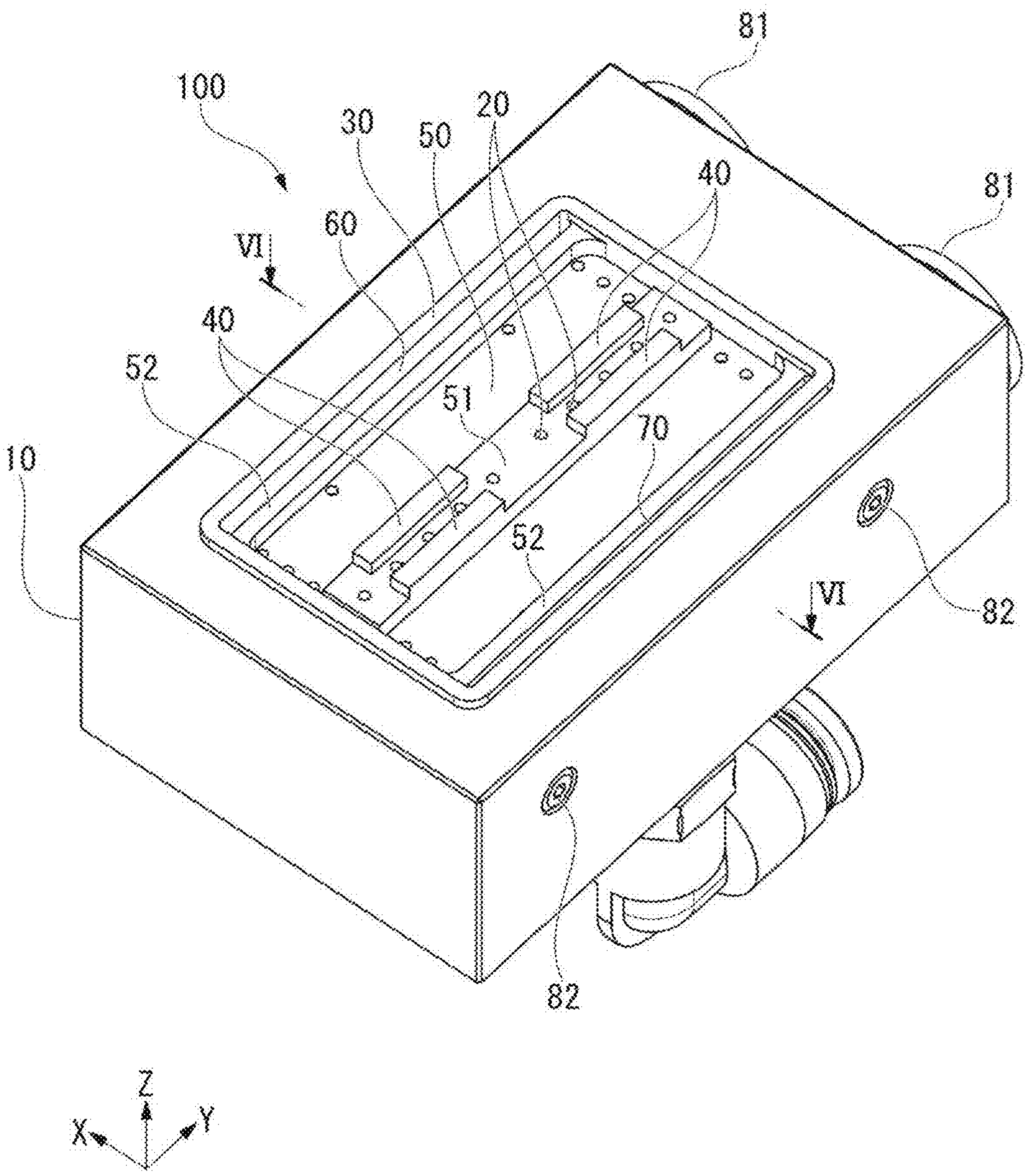
FIG. 4 is a perspective view of a holder related to the embodiment.
Figure 5:
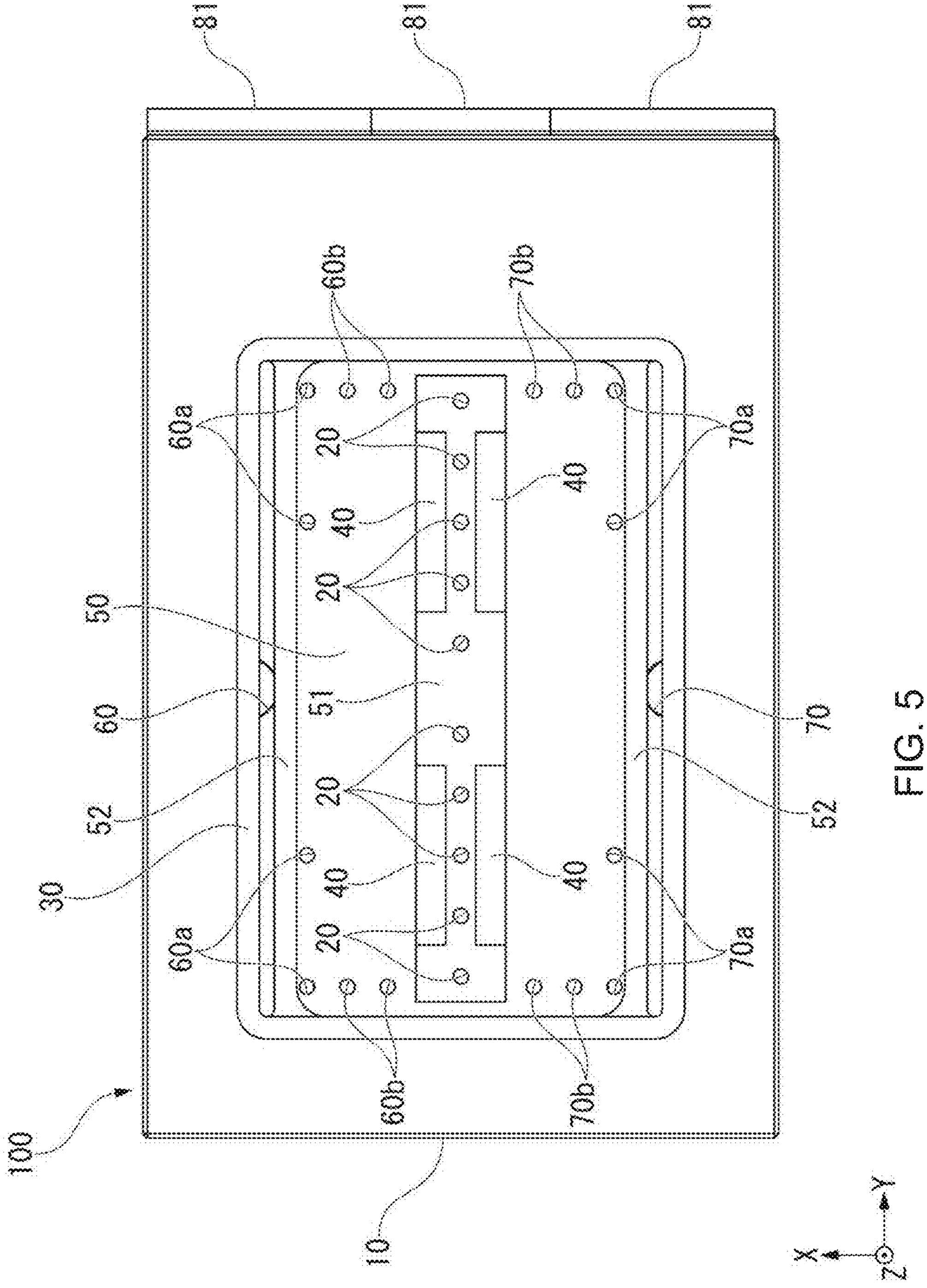
FIG. 5 is a plan view of the holder related to the embodiment.
Figure 6:
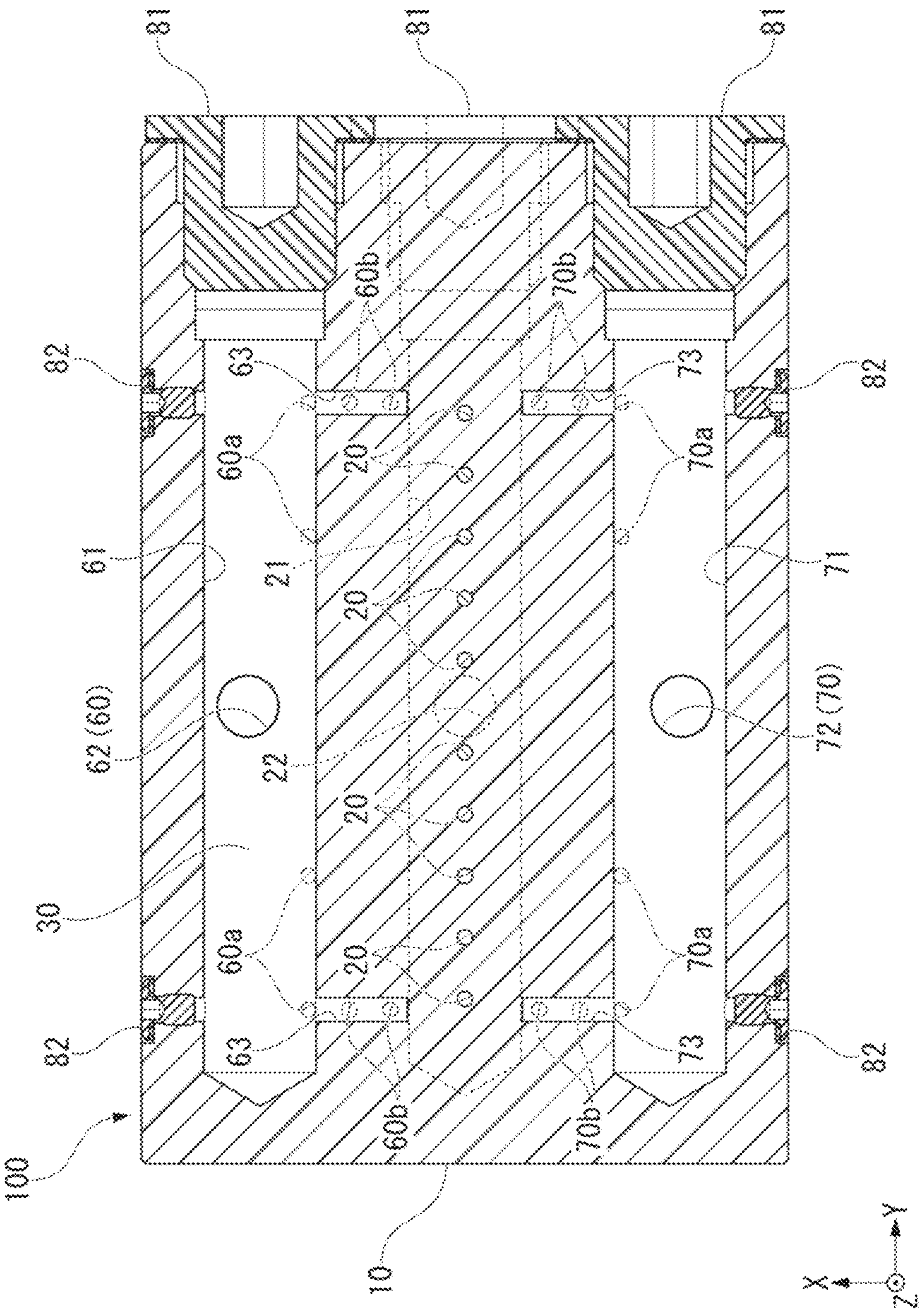
FIG. 6 is a planar cross-sectional view of the holder related to the embodiment.

FIG. 3 is a perspective view of a cleaning device 100 according to the embodiment. FIG. 4 is a perspective view of the holder 10 related to the embodiment. FIG. 5 is a plan view of the holder 10 related to the embodiment. FIG. 6 is a planar cross-sectional view of the holder 10 related to the embodiment.

As shown in FIG. 3, the holder 10 engages with the opening part 213 of the nozzle plate 201 to move in the X-axis direction relatively to the inkjet head 200 to thereby perform the cleaning.

As shown in FIG. 4, the holder 10 is formed to have a rectangular box like shape. On an upper surface of the holder 10, there are disposed the jet section 20, the contact part 30, the protruding parts 40, the recessed part 50, and the suction parts 60, 70. It should be noted that the jet section 20, the contact part 30, the protruding parts 40, the recessed part 50, and the suction parts 60, 70 are integrally molded with the holder 10, and have substantially the same rigidity as that of the holder 10. The jet section 20 includes a plurality of cleaning liquid jet holes formed at intervals in the Y-axis direction in a central portion in the X-axis of the holder 10. The jet section 20 (the plurality of cleaning liquid jet holes) are communicated with the jet section chamber 21 as shown in FIG. 6.

The jet section chamber 21 is a non-penetrating hole part formed from a side surface facing to the +Y side of the holder 10 toward a side surface at the −Y side. The opening part of the end portion at the +Y side of the jet section chamber 21 is sealed with a sealing member 81 (e.g., a screw member). The jet section chamber 21 is formed in a central portion in the X-axis direction of the holder 10, and is disposed at the lower side (the −Z side) of the suction part chambers 61, 71.

As shown in FIG. 5, the contact part 30 is formed to have a rectangular frame shape (rectangular annular shape) surrounding the jet section 20 in a plan view. The contact part 30 protrudes toward the +Z side from the upper surface of the holder 10 to have contact with a surface (a guard surface 211) of the nozzle guard 210 provided with the opening parts 213. The contact part 30 is disposed to have a convex shape at a constant height along an opening peripheral edge part of the recessed part 50.

The protruding parts 40 are formed inside the contact part 30 in the plan view. It should be noted that the protruding parts 40 are formed integrally with the holder 10, has high rigidity, but does not have such flexibility as that of the wiper. The protruding parts 40 each have a rectangular shape taking the Y-axis direction as the longitudinal direction in the plan view. The protruding parts 40 are inserted into the opening parts 213 in a non-contact state with the nozzle plate 201, and at the same time, guides the holder 10 along the longitudinal direction of the opening part 213. Specifically, an upper end of each of the protruding parts 40 is located at the upper side (the +Z side) of the upper end of the contact part 30, but does not have contact with the nozzle plate 201 (see FIG. 1, and FIGS. 9A, 9B described later).

As shown in FIG. 5, a plurality (two in the present embodiment) of the protruding parts 40 is disposed at intervals in the X-axis direction (the longitudinal direction of the opening part 213). It should be noted that two sets of the two protruding parts 40 having that positional relationship are provided to the holder 10 in the present embodiment at intervals in the Y-axis direction. In other words, the holder 10 is provided with the four protruding parts 40. The jet sections 20 are disposed between the protruding parts 40 adjacent in the X-axis direction to each other.

As shown in FIG. 4, the recessed part 50 is formed on the periphery of the protruding parts 40, and inside the contact part 30 in the plan view. The recessed part 50 is recessed toward the −Z side from the upper surface of the holder 10. The recessed part 50 is provided with a pedestal part 51 and wall parts 52. The pedestal part 51 is erected from the bottom wall of the recessed part 50 at the height no higher than the upper end of the recessed part 50 (the contact part 30) in a central portion in the X-axis direction of the recessed part 50.

The pedestal part 51 extends in the Y-axis direction, and the jet section 20 and the protruding parts 40 are formed on the upper surface of the pedestal part 51. The wall parts 52 are erected from the bottom wall of the recessed part 50 at the height no lower than an upper end of the pedestal part 51 and no higher than the upper end of the recessed part 50 (the contact part 30) in the vicinity of both end portions in the X-axis direction of the recessed part 50. The wall parts 52 each form a slit-like space part which extends in the Y-axis direction to surround the suction parts 60, 70.

As shown in FIG. 5, the suction part 60 is formed inside the recessed part 50 in the plan view. The suction part 60 is disposed at the +X side of the jet section 20 in the X-axis direction (the longitudinal direction of the opening part 213). The suction part 60 communicates the slit-like space part formed in the end portion at the +X side of the recessed part 50 with the suction part chamber 61 shown in FIG. 6.

The suction part chamber 61 is a non-penetrating hole part formed from the side surface facing to the +Y side of the holder 10 toward the side surface at the −Y side. The opening part of the end portion at the +Y side of the suction part chamber 61 is sealed with the sealing member 81 (e.g., a screw member). The suction part chamber 61 is formed at the +X side of the holder 10, and is disposed at an upper side (the +Z side) of the jet section chamber 21.

As shown in FIG. 5, the suction part 60 is provided with suction holes 60*a*, 60*b* disposed at the inner side of the wall parts 52 (at a central portion side in the X-axis direction) in the recessed part 50. The suction holes 60*a* are formed along the wall part 52. The suction holes 60*b* are formed along both side wall surfaces of the recessed part 50 opposed in the Y-axis direction to each other.

As shown in FIG. 6, the suction holes 60*a* are communicated with the suction part chamber 61. The suction holes 60*b* are communicated with the suction part chamber 61 via chamber communication parts 63. The chamber communication part 63 is a non-penetrating hole part formed from the side surface facing to the +X side of the holder 10 toward the side surface at the −X side. The opening part of the end portion at the +X side of the chamber communication part 63 is sealed with a sealing member 82 (e.g., a screw member).

As shown in FIG. 5, the suction part 70 is formed inside the recessed part 50 in the plan view. The suction part 70 is disposed at the −X side of the jet section 20 in the X-axis direction (the longitudinal direction of the opening part 213). The suction part 70 communicates the slit-like space part formed in the end portion at the −X side of the recessed part 50 with the suction part chamber 71 shown in FIG. 6.

The suction part chamber 71 is a non-penetrating hole part formed from the side surface facing to the +Y side of the holder 10 toward the side surface at the −Y side. The opening part of the end portion at the +Y side of the suction part chamber 71 is sealed with the sealing member 81 (e.g., a screw member). The suction part chamber 71 is formed at the −X side of the holder 10, and is disposed at an upper side (the +Z side) of the jet section chamber 21.

As shown in FIG. 5, the suction part 70 is provided with suction holes 70*a*, 70*b* disposed at the inner side of the wall parts 52 (at a central portion side in the X-axis direction) in the recessed part 50. The suction holes 70*a* are formed along the wall part 52. The suction holes 70*b* are formed along both side wall surfaces of the recessed part 50 opposed in the Y-axis direction to each other.

As shown in FIG. 6, the suction holes 70*a* are communicated with the suction part chamber 71. The suction holes 70*b* are communicated with the suction part chamber 71 via chamber communication parts 73. The chamber communication part 73 is a non-penetrating hole part formed from the side surface facing to the −X side of the holder 10 toward the side surface at the +X side. The opening part of the end portion at the −X side of the chamber communication part 73 is sealed with the sealing member 82 (e.g., a screw member).

Then, the dimensional and positional relationships between the jet section 20, the protruding parts 40, the nozzle holes 202, and the opening parts 213 will be described.

Figure 7A:
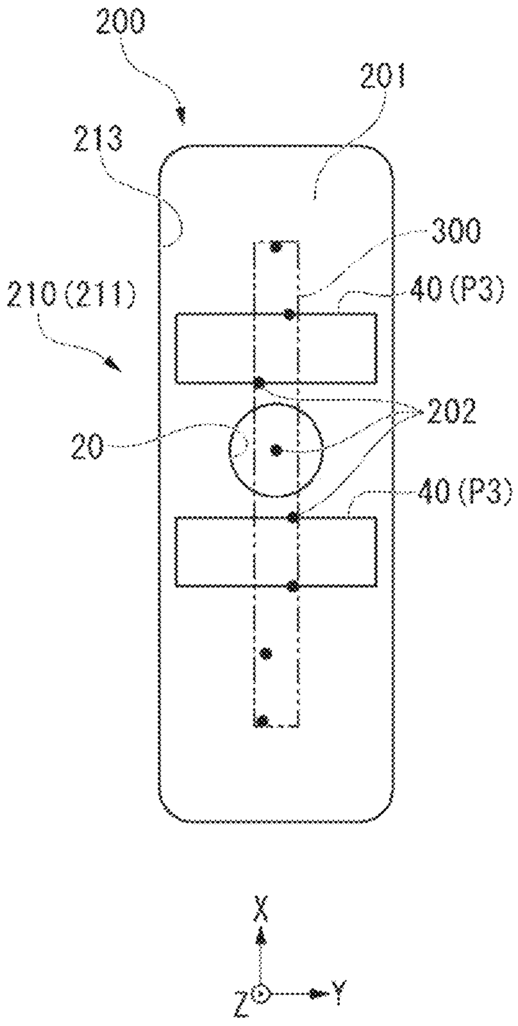
FIGS. 7A and 7B are each a schematic plan view of an opening part related to the embodiment.
Figure 7B:
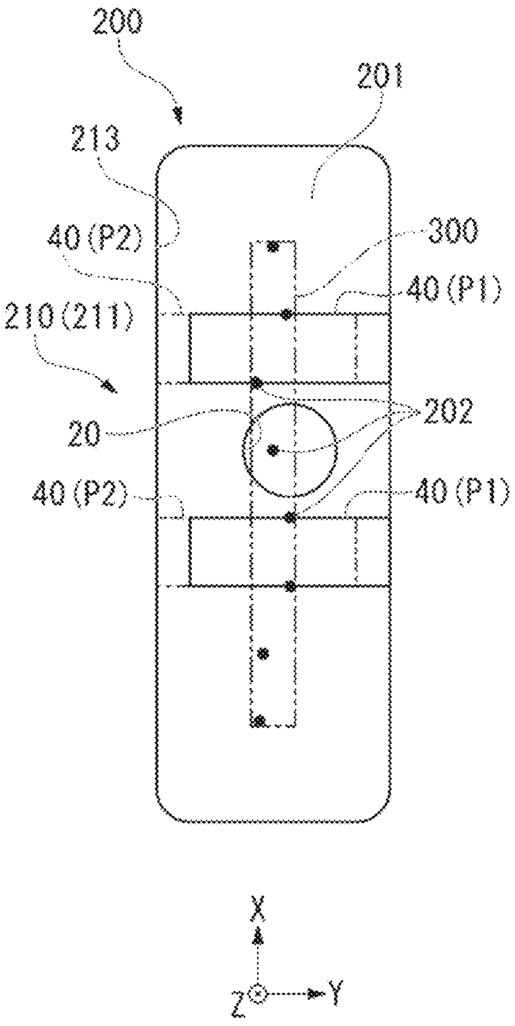

FIGS. 7A, 7B are each a schematic plan view of the opening part 213 related to the embodiment.

As shown in FIGS. 7A, 7B, the protruding parts 40 has the dimension in the Y-axis direction with which the protruding part 40 can be inserted into the opening part 213 of the nozzle guard 210. In other words, the dimension in the Y-axis direction of the protruding part 40 is slightly smaller than the dimension in the Y-axis direction (the transverse direction) of the opening part 213. Therefore, the protruding parts 40 can each take a first state P1, a second state P2, and a third state P3 described below in the transverse direction in the opening part 213.

The first state P1 means a state in which the protruding part 40 has contact with a side surface at one side (e.g., the +Y side) in the transverse direction of the opening part 213 as shown in FIG. 7B. The second state P2 means a state in which the protruding part 40 has contact with a side surface at the other side (e.g., the −Y side) in the transverse direction of the opening part 213 as shown in FIG. 7B. Further, the third state P3 means a state in which the protruding part 40 has contact with neither of the both sides in the transverse direction of the opening part 213 as shown in FIG. 7A.

At least one of the plurality of cleaning liquid jet holes constituting the jet section 20 has the arrangement and the size opposed in the Z-axis direction to a jet area 300 formed of the plurality of nozzle holes 202 in either of the first state P1, the second state P2, and the third state P3 described above. It should be noted that in the present embodiment, the "jet area 300" means a minimum rectangular area which includes the plurality of nozzle holes 202, and in which at least one of the plurality of nozzle holes 202 is inscribed. Thus, even when a gap in the transverse direction exists between the protruding part 40 and the opening part 213, it is possible to always make the jet section 20 (the cleaning liquid jet holes) opposed to the jet area 300.

Figure 8:
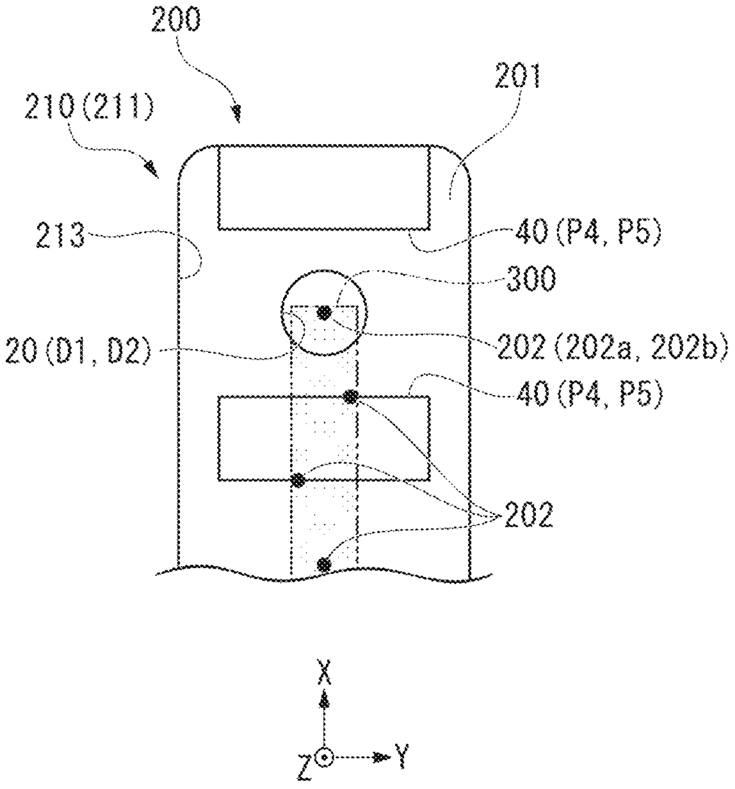
FIG. 8 is a schematic plan view of an end portion in a longitudinal direction of the opening part related to the embodiment.

FIG. 8 is a schematic plan view of an end portion in the longitudinal direction of the opening part 213 related to the embodiment.

As shown in FIG. 8, the protruding parts 40 can make contact with the end portion in the longitudinal direction (the X-axis direction) of the opening part 213 of the nozzle guard 210. Therefore, the protruding parts 40 can each take a fourth state P4 and a fifth state P5 described below in the longitudinal direction in the opening part 213. It should be noted that the illustration of the fifth state P5 is omitted in FIG. 8 since the fourth state P4 and the fifth state P5 are the same except the direction.

The fourth state P4 means a state in which the protruding part 40 has contact with a side surface at one side (e.g., the +X side) in the longitudinal direction of the opening part 213. At least one of the plurality of cleaning liquid jet holes which forms the jet section 20 is located at a first opposed position D1 opposed to the nozzle hole 202*a* which is located in an end portion at one side in the longitudinal direction of the opening part 213 out of the plurality of nozzle holes 202 in the fourth state P4. Alternatively, that cleaning liquid jet hole is located at one side (the +X side) in the longitudinal direction of the opening part 213 with respect to the first opposed position D1. Thus, it is possible to perform the cleaning up to the nozzle hole 202*a* disposed in the end portion at the +X side.

Meanwhile, the fifth state P5 means a state in which the protruding part 40 has contact with a side surface at the other side (e.g., the −X side) in the longitudinal direction of the opening part 213. At least one of the plurality of cleaning liquid jet holes which forms the jet section 20 is located at a second opposed position D2 opposed to the nozzle hole 202*b* which is located in an end portion at the other side in the longitudinal direction of the opening part 213 out of the plurality of nozzle holes 202 in the fifth state P5. Alternatively, that cleaning liquid jet hole is located at the other side (the −X side) in the longitudinal direction of the opening part 213 with respect to the second opposed position D2. Thus, it is possible to perform the cleaning up to the nozzle hole 202*b* disposed in the end portion at the −X side.

Subsequently, the usage of the cleaning device 100 having the configuration described above will be described with reference to FIG. 1 and FIGS. 9A, 9B.

Figure 9B:
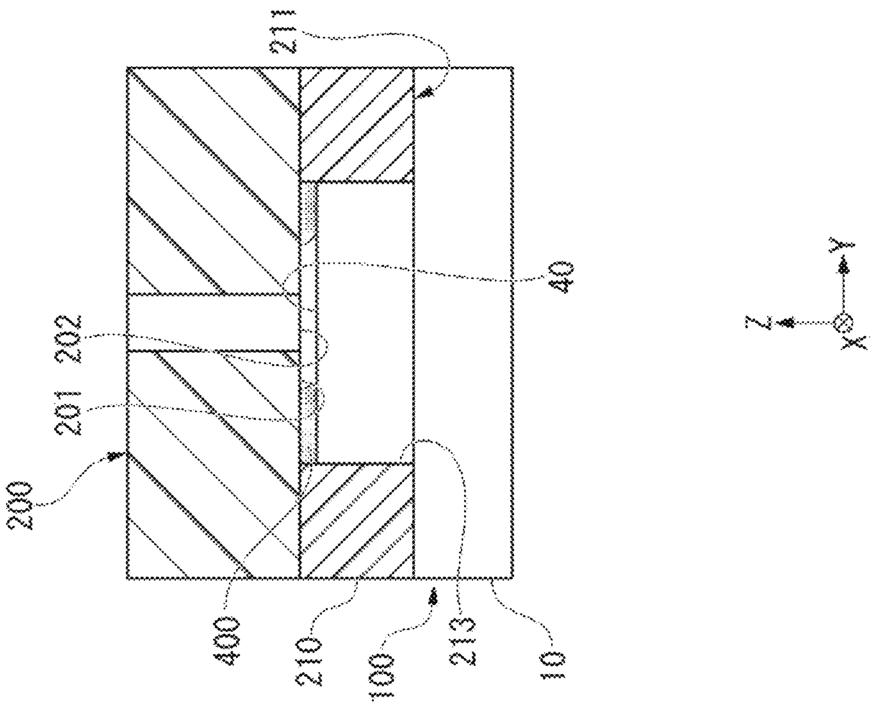
FIGS. 9A and 9B are schematic dross-sectional views for explaining an action of the cleaning device when cleaning the inkjet head according to the embodiment.
Figure 9A:
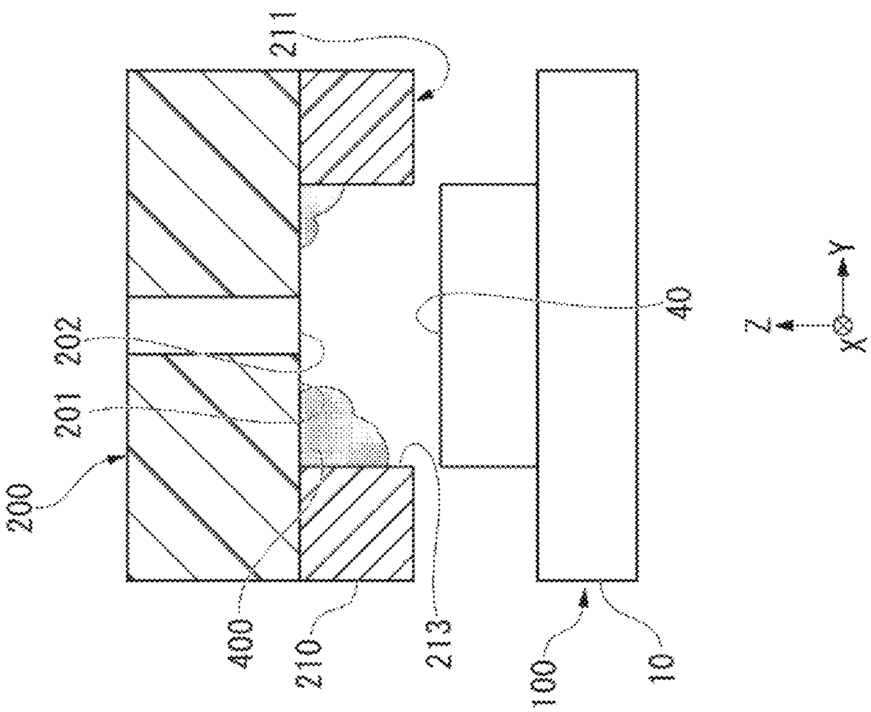

FIGS. 9A, 9B are schematic dross-sectional views for explaining an action of the cleaning device 100 when cleaning the inkjet head 200 according to the embodiment.

First, as shown in FIG. 1, when cleaning the inkjet head 200, the operator grips the holder 10, and presses the upper surface of the holder 10 against the lower surface of the inkjet head 200. On this occasion, by the contact part 30 making contact with the surface (the guard surface 211) of the nozzle guard 210, alignment in the Z-axis direction (the jet direction, the gravitational direction) is achieved. Further, by the protruding parts 40 being inserted into the opening part 213 of the nozzle guard 210, the alignment in the Y-axis direction (the transverse direction of the opening part 213) is achieved. Thus, even in a situation in which the nozzle plate 201 of the inkjet head 200 cannot visually be checked, and when a manual work is performed, the alignment of the holder 10 can easily be achieved.

Then, by moving the holder 10 thus aligned in the X-axis direction (the longitudinal direction of the opening part 213) to jet the cleaning liquid, it is possible to clean the surfaces of the nozzle plate 201 and the nozzle guard 210, and the inside of the opening part 213 of the nozzle guard 210. It should be noted that since the protruding part 40 is inserted into the opening part 213 in a state in which the protruding part 40 does not have contact with the nozzle plate 201 as shown in FIG. 9B, there is no chance of injuring the nozzle plate 201. Further, by moving the protruding part 40 in the X-axis direction, ink 400 (ink high in viscosity, or fixed ink) retained in a corner part between the nozzle plate 201 and the side surface of the opening part 213 as shown in FIG. 9A can be removed as shown in FIG. 9B.

Further, by jetting the cleaning liquid from the jet section 20 to the nozzle plate 201 as shown in FIG. 1, it is possible to perform jet cleaning. Further, by suctioning the cleaning liquid from the suction parts 60, 70, it is possible to perform suction cleaning. It should be noted that when performing the alignment of the holder 10, the inside of the recessed part 50 has atmosphere communication paths communicated with the atmosphere at both sides in the longitudinal direction (the Y-axis direction) of the opening part 213, but the suction parts 60, 70 are arranged across the jet section 20. Therefore, since the cleaning liquid jetted is jetted to the nozzle plate 201 and the inside of the opening part 213, and is then suctioned by the suction parts 60, 70 arranged across the jet section 20, leakage of the cleaning liquid does not occur.

As described above, the cleaning device 100 for the inkjet head 200 according to the present embodiment is provided with the holder 10 for performing the cleaning by moving relatively to the inkjet head 200 which is provided with the nozzle plate 201 provided with the plurality of nozzle holes 202 for jetting the ink, and the nozzle guard 210 which covers the nozzle plate 201 and is provided with the opening parts 213 each shaped like an elongated hole and exposing the plurality of nozzle holes 202, and the holder 10 is provided with the jet section 20 for jetting the cleaning liquid toward at least one of the nozzle plate 201 and the nozzle guard 210, the contact part 30 which makes contact with the surface of the nozzle guard 210 provided with the opening parts 213, and the protruding parts 40 which are inserted into the opening parts 213 in a non-contact state to the nozzle plate 201, and which guide the holder 10 along the longitudinal direction of the opening parts 213.

According to this configuration, even when the side surfaces of the inkjet head 200 are not exposed, and a part of the nozzle plate 201 fails to be exposed by the nozzle guard 210, it is possible to easily achieve the alignment with the inkjet head 200, and it is possible to clean the surfaces of the nozzle plate 201 and the nozzle guard 210, and the inside of the opening parts 213 of the nozzle guard 210 without injuring the nozzle plate 201.

Further, as shown in FIG. 1, in the cleaning device 100 for the inkjet head 200 according to the present embodiment, the holder 10 is provided with the recessed part 50 for receiving the cleaning liquid jetted by the jet section 20. According to this configuration, the cleaning liquid can be prevented from dripping off from the holder 10.

Further, in the cleaning device 100 for the inkjet head 200 according to the present embodiment, the holder 10 is provided with the suction parts 60, 70 arranged in the recessed part 50. According to this configuration, the cleaning liquid can be prevented from spilling over the recessed part 50. Further, it becomes also possible to perform the suction cleaning for suctioning the ink in the state in which the cleaning liquid is not used.

Further, in the cleaning device 100 for the inkjet head 200 according to the present embodiment, the holder 10 is provided with the wall parts 52 which are erected from the bottom wall of the recessed part 50 with the height no higher than the upper end of the recessed part 50 to form the space part surrounding the suction parts 60, 70. According to this configuration, it becomes easy to provide negative pressure around the suction parts 60, 70, and thus, it is possible to increase the efficiency of suctioning the cleaning liquid.

Further, in the cleaning device 100 for the inkjet head 200 according to the present embodiment, the suction parts 60, 70 are disposed at both sides across the jet section 20 in the longitudinal direction of the opening parts 213. According to this configuration, the cleaning liquid which runs through the opening part 213 of the nozzle guard 210 can be prevented from dripping off from the both sides in the longitudinal direction.

Further, in the cleaning device 100 for the inkjet head 200 according to the present embodiment, the contact part 30 is disposed along an opening circumferential edge part of the recessed part 50 so as to form a convex shape. According to this configuration, even in the state in which the side surfaces of the inkjet head 200 are not exposed, and a part of the nozzle guard 210 is recessed so as to form a shape concave upward as shown in, for example, FIG. 3, since the contact part 30 having a convex shape can make contact with the surface of the nozzle guard 210, the alignment of the holder 10 can easily be performed, and the cleaning on the inkjet head 200 becomes possible. Further, since the upper end position of the recessed part 50 rises due to the contact part 30, it is possible to prevent the cleaning liquid from spilling over the recessed part 50.

Further, in the cleaning device 100 for the inkjet head 200 according to the present embodiment, a plurality of the protruding parts 40 is disposed at intervals in the longitudinal direction of the opening parts 213 as shown in FIGS. 7A, 7B. According to this configuration, by the plurality of protruding parts 40 making contact with the side walls in the transverse direction of the opening parts 213 in which the plurality of protruding parts 40 is inserted, a rotation around an axis extending in the Z-axis direction (the jet direction, the gravitational direction) of the holder 10 can be regulated.

Further, in the cleaning device 100 for the inkjet head 200 according to the present embodiment, the jet section 20 is disposed between the protruding parts 40 adjacent in the longitudinal direction of the opening parts 213 to each other. According to this configuration, it is possible to dispose the jet section 20 using a space in a valley portion between the plurality of protruding parts 40, and further, it becomes easy to jet the cleaning liquid to an aimed portion due to a rotation regulation of the holder 10.

Further, in the cleaning device 100 for the inkjet head 200 according to the present embodiment, the jet section 20 has the plurality of cleaning liquid jet holes, and at least one of the cleaning liquid jet holes is opposed to the jet area 300 formed of the plurality of nozzles 202 in the first state P1 in which the protruding parts 40 have contact with the side surface at the one side in the transverse direction of the opening parts 213, and the second state P2 in which the protruding parts 40 have contact with the side surface at the other side in the transverse direction of the opening parts 213 as shown in FIG. 7B, and the third state P3 in which the protruding parts 40 have contact with neither of the side surfaces at the both sides in the transverse direction of the opening parts 213 as shown in FIG. 7A. According to this configuration, even when a gap in the transverse direction exists between the protruding part 40 and the opening part 213, it is possible to always make the jet section 20 (the cleaning liquid jet holes) opposed to the jet area 300.

Further, in the cleaning device 100 of the inkjet head 200 according to the present embodiment, the jet section 20 has the plurality of cleaning liquid jet holes, at least one of the cleaning liquid jet holes is located at the first opposed position D1 opposed to the nozzle hole 202*a* located in an end portion at one side in the longitudinal direction of the opening part 213 out of the plurality of nozzle holes 202, or at one side in the longitudinal direction of the opening part 213 with respect to the first opposed position D1 in the fourth state P4 in which the protruding part 40 has contact with the side surface at one side in the longitudinal direction of the opening part 213 as shown in FIG. 8, and is located at the second opposed position D2 opposed to the nozzle hole 202*b* located in the end portion at the other side in the longitudinal direction of the opening part 213 out of the plurality of nozzle holes 202, or at the other side in the longitudinal direction of the opening part 213 with respect to the second opposed position D2 in the fifth state P5 in which the protruding part 40 has contact with the side surface at the other side in the longitudinal direction of the opening part 213. According to this configuration, by moving the holder 10 from the state in which the protruding part 40 is aligned with the side surface at either one of the sides in the longitudinal direction of the opening part 213 toward the side surface at the other side in the longitudinal direction of the opening part 213, it is possible to clean all of the nozzle holes 202.

It should be noted that the cleaning device 100 for the inkjet head 200 described above may adopt the following configuration.

Figure 10:
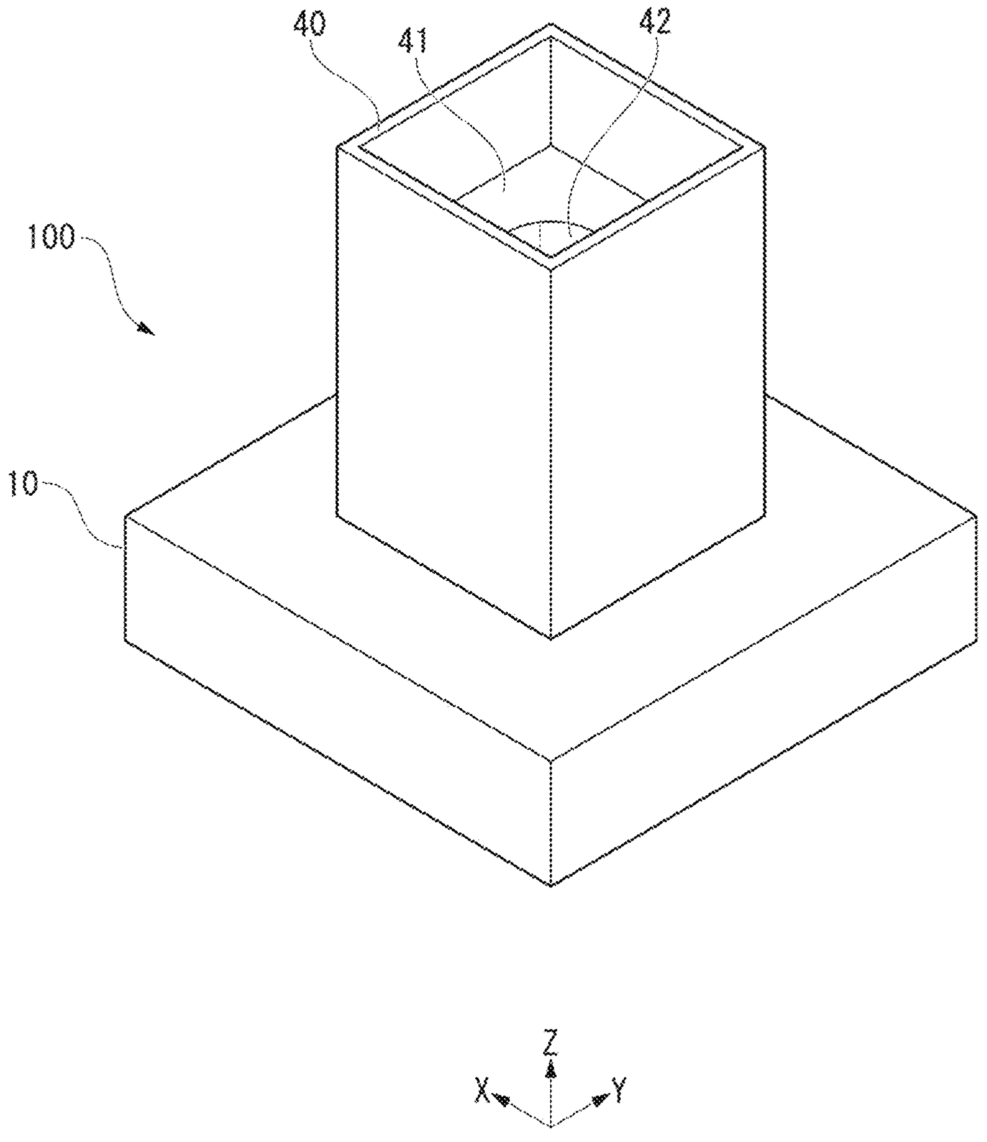
FIG. 10 is a perspective view of a protruding part related to a first modified example of the embodiment.

FIG. 10 is a perspective view of a protruding part 40 related to a first modified example of the embodiment.

The protruding part 40 shown in FIG. 10 is provided with a depressed part 41 formed on the upper end surface of the protruding part 40, and a protruding part cleaning liquid jet hole 42 formed in the depressed part 41. The depressed part 41 is a bottomed groove, and is formed on the upper end surface of the protruding part 40. The protruding part cleaning liquid jet hole 42 is formed on the bottom surface of the depressed part 41. The protruding part cleaning liquid jet hole 42 may be coupled to the jet section chamber 21 shown in, for example, FIG. 1, or may be coupled to a cleaning liquid supply device different from the jet section 20.

According to this configuration, for example, by accumulating the cleaning liquid in the depressed part formed on the upper end surface of the protruding part 40 to form a pool, and pressing a portion of the cleaning liquid raised by the surface tension against the nozzle plate 201, it is possible to softly clean the nozzle plate 201.

Figure 11:
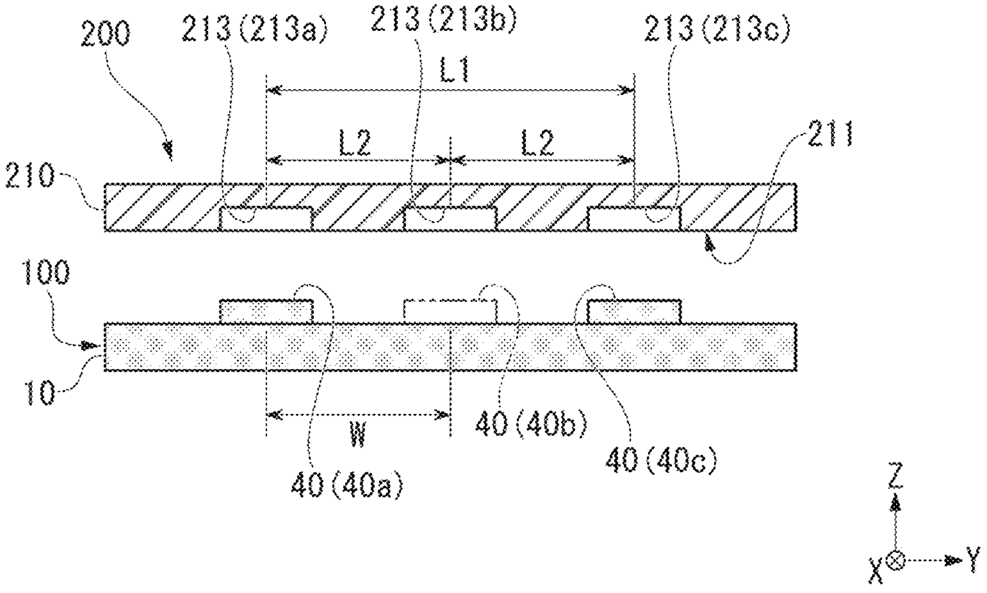
FIG. 11 is a schematic cross-sectional view showing an arrangement relationship between the opening part and the protruding part related to a second modified example of the embodiment.

FIG. 11 is a schematic cross-sectional view showing an arrangement relationship between the opening parts 213 and the protruding parts 40 related to a second modified example of the embodiment.

As shown in FIG. 11, the plurality of opening parts 213 of the nozzle guard 210 is formed at intervals in the Y-axis direction (the transverse direction of the opening parts 213). The protruding parts 40 are disposed as a pair at an interval which makes it possible to insert the protruding parts 40 to the two opening parts 213*a*, 213*c* formed at a unique interval L1 out of the plurality of opening parts 213. In the example shown in FIG. 11, the interval W of the protruding parts 40 is adjusted to become the interval L1 which makes it possible to insert the protruding parts 40 into the two opening parts 213*a*, 213*c* located in the both end portions in the transverse direction of the opening part 213 out of the plurality of opening parts 213.

The nozzle guard 210 shown in FIG. 11 is provided with three opening parts 213*a* through 213*c* at intervals in the Y-axis direction. The opening parts 213*a*, 213*b* are formed at an interval L2 in the Y-axis direction. The opening parts 213*b*, 213*c* are formed at the interval L2 in the Y-axis direction. The opening parts 213*a*, 213*c* are formed at the interval L1 in the Y-axis direction. In other words, since there are two intervals L2, the interval L2 is non-unique, while there is one interval L1, and therefore, the interval L1 is unique.

Figure 12A:
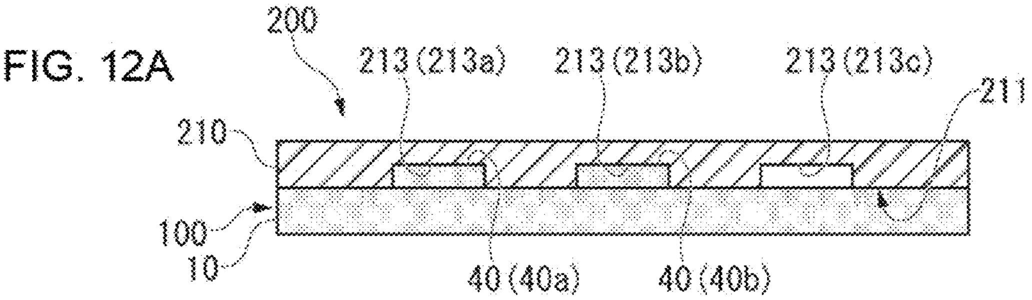
FIGS. 12A and 12B are diagrams showing a condition when providing the protruding parts at non-unique intervals in the second modified example of the embodiment.
Figure 12B:
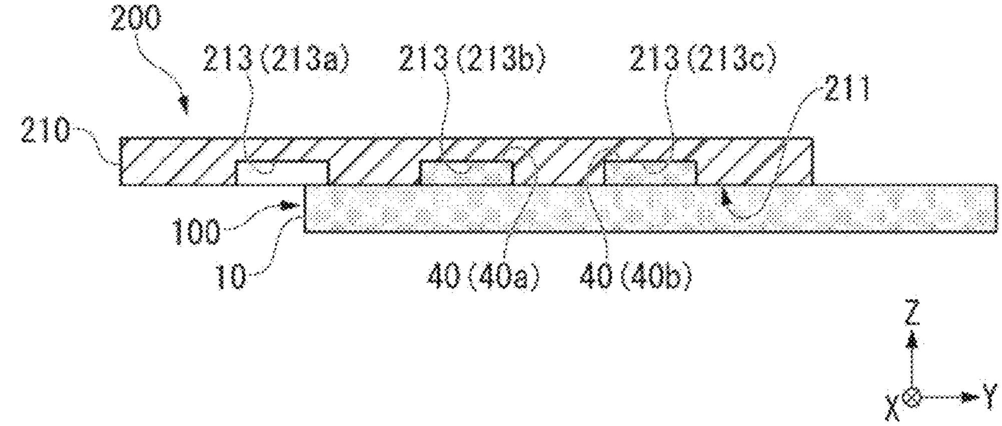

FIGS. 12A, 12B are diagrams showing a condition when providing the protruding parts 40 at non-unique intervals L2 in the second modified example of the embodiment.

The holder 10 shown in FIGS. 12A, 12B is provided with the protruding parts 40*a*, 40*b* at the interval L2 in the Y-axis direction. In the holder 10, as shown in FIG. 12A, the protruding parts 40*a*, 40*b* can be inserted into the opening parts 213*a*, 213*b*. Further, in the holder 10, as shown in FIG. 12B, the protruding parts 40*a*, 40*b* can be inserted into the opening parts 213*b*, 213*c*. Then, an alignment posture of the holder 10 to the inkjet head 200 is not uniquely set, and there is a possibility that the holder 10 engages with the inkjet head 200 at an unintended posture.

Figure 13A:
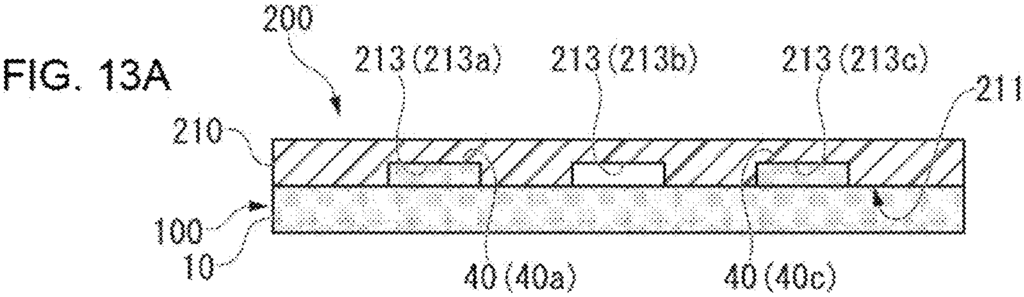
FIGS. 13A and 13B are diagrams showing a condition when providing the protruding parts at unique intervals in the second modified example of the embodiment.
Figure 13B:
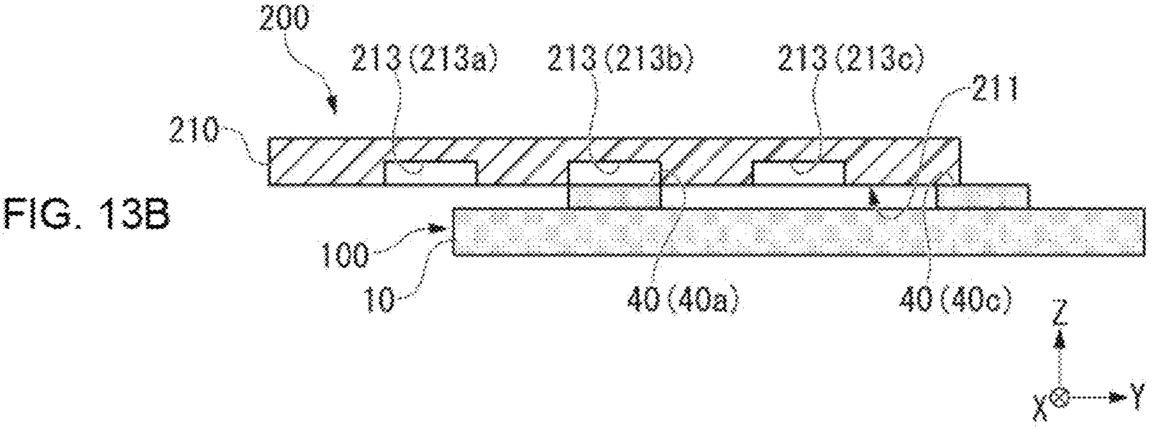

FIGS. 13A, 13B are diagrams showing a condition when providing the protruding parts 40 at a unique interval L1 in the second modified example of the embodiment.

The holder 10 shown in FIGS. 13A, 13B is provided with the protruding parts 40*a*, 40*c* at the interval L1 in the Y-axis direction. In the holder 10, as shown in FIG. 13A, the protruding parts 40*a*, 40*c* can be inserted into the opening parts 213*a*, 213*c*. On the other hand, in the holder 10, even when the protruding part 40*a* is urged to be inserted into the opening part 213*b* as shown in FIG. 13B, the protruding part 40*c* hits against the guard surface 211 to prevent the engagement.

As described above, by disposing the protruding parts 40 as a pair at the interval which makes it possible to insert the protruding parts 40 into the two opening parts 213*a*, 213*c* formed at the unique interval L1 out of the plurality of opening parts 213, the alignment posture of the holder 10 to the inkjet head 200 is uniquely set even when the nozzle guard 210 is provided with the plurality of opening parts 213, and thus, it is possible to prevent the holder 10 from being engaged with the inkjet head 200 at an unintended posture. Thus, it is possible to clean all of the opening parts 213 of the nozzle guard 210 by the engagement and the contact with the holder 10 as long as the holder 10 is made symmetrically in the longitudinal direction (the X-axis direction) of the opening part 213 of the nozzle guard 210, and the opening surface of the nozzle guard 210 is symmetric in the transverse direction of the nozzle guard 210 (the Y-axis direction, the direction in which the nozzle arrays are arranged) when the inkjet head 200 and the holder 10 are engaged with each other.

Figure 14:
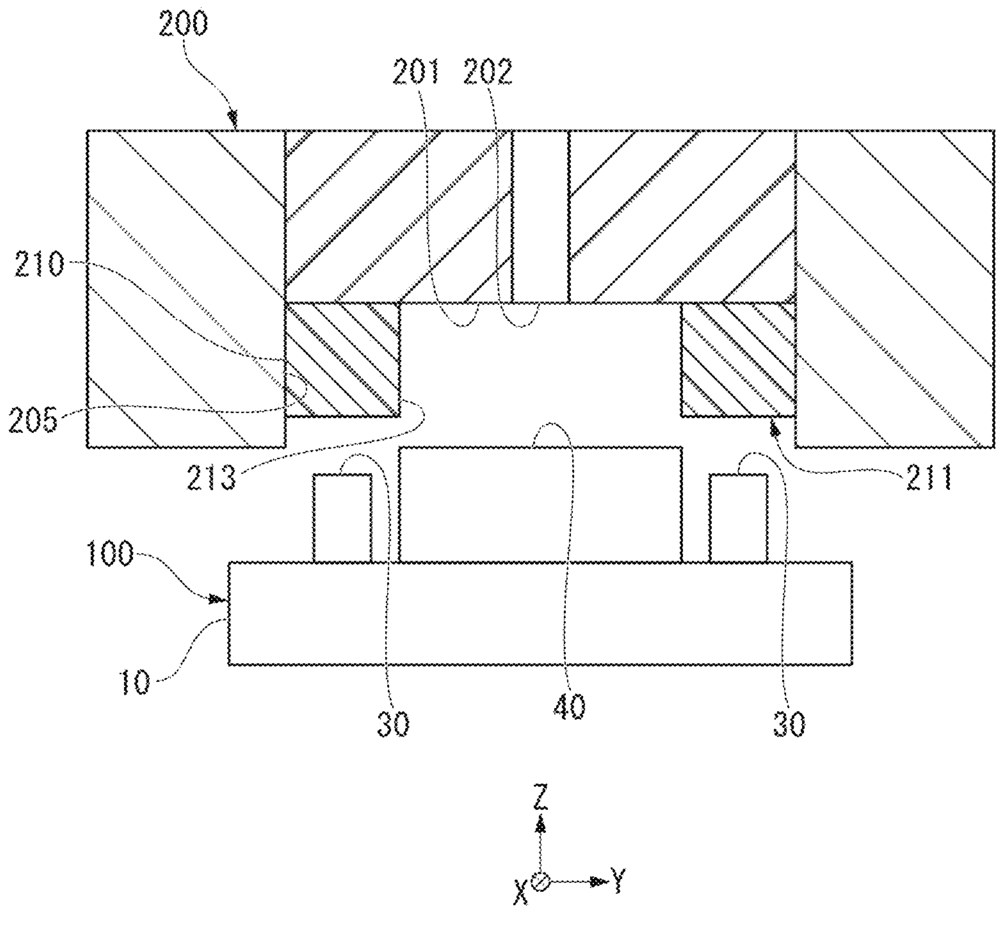
FIG. 14 is a schematic cross-sectional view of a nozzle guard and a holder related to a third modified example of the embodiment.

FIG. 14 is a schematic cross-sectional view of the nozzle guard 210 and the holder 10 related to a third modified example of the embodiment.

The nozzle guard 210 shown in FIG. 14 is in a state in which the entire length in the thickness direction (the Z-axis direction) thereof is embedded on the lower surface of the inkjet head 200 so as to form a shape concave upward. Even in this case, by making the contact part 30 of the holder 10 have contact with the surface (the guard surface 211) of the nozzle guard 210, it is possible to easily achieve the alignment of the holder 10, and thus, it becomes possible to perform the cleaning on the inkjet head 200.

Figure 15:
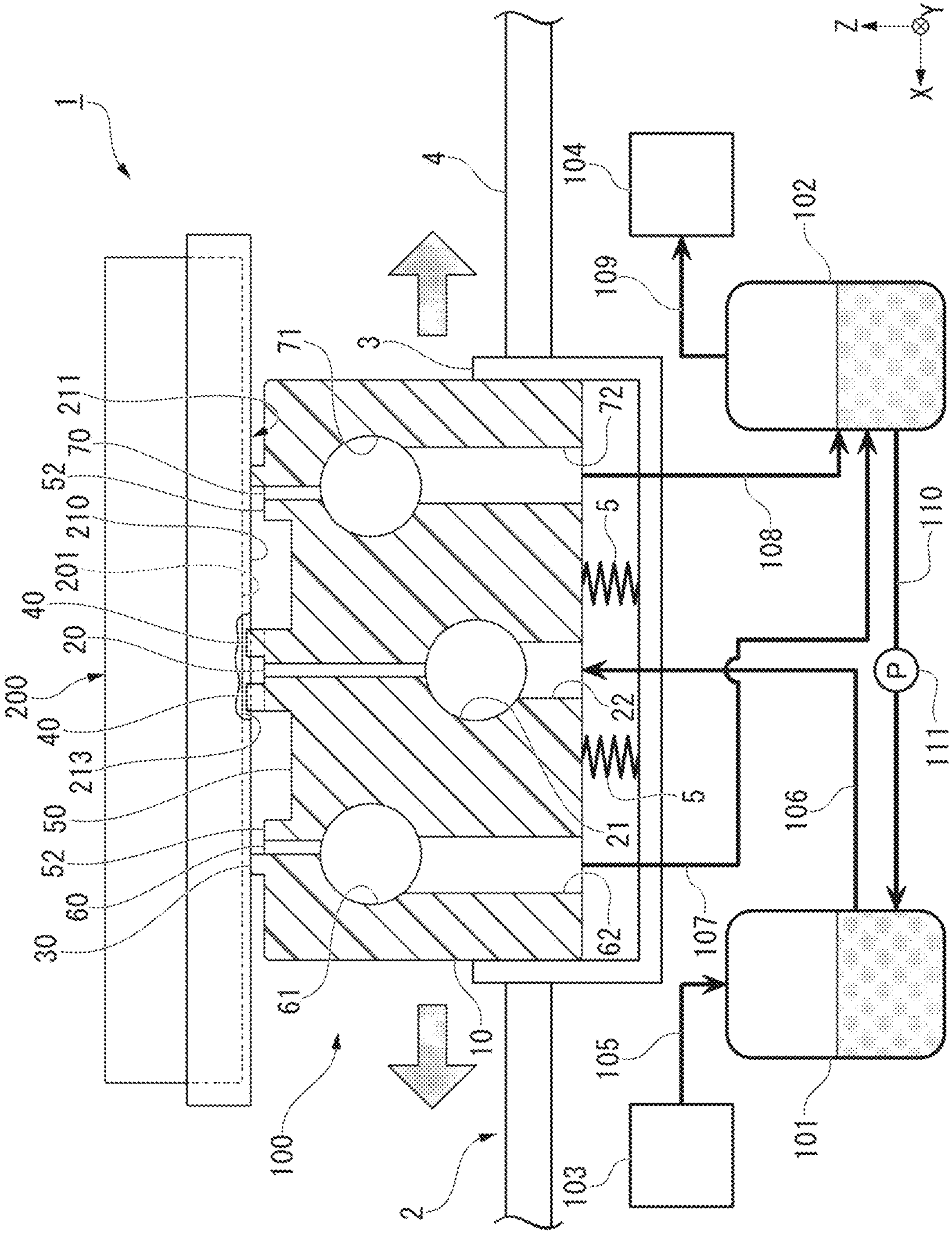
FIG. 15 is a configuration diagram of an inkjet printer according to a fourth modified example of the embodiment.

FIG. 15 is a configuration diagram of the inkjet printer 1 according to a fourth modified example of the embodiment.

The inkjet printer 1 shown in FIG. 15 is provided with the inkjet head 200 and the cleaning device 100. Specifically, in the embodiment and the modified examples described above, the cleaning device 100 is manually operated, but in the present modified example, there is adopted the configuration in which the cleaning device 100 is automatically or semi-automatically operated.

The inkjet printer 1 is provided with a holder moving device 2 for moving the holder 10. The holder moving device 2 is provided with a carriage 3 loaded with the holder 10, a rail 4 for guiding the carriage 3 in the X-axis direction, and a drive device not shown for moving the carriage 3 along the rail 4. As the drive device, there can be illustrated a drive device having, for example, a belt coupled to the carriage 3, pulleys for circulating the belt, and a motor for rotating the pulleys.

The holder 10 is made capable of moving in the X-axis direction along the rail 4 from a stand-by position where the holder 10 is not opposed to the inkjet head 200 in the Z-axis direction, and further moving to a position which is at the opposite side to the stand-by position, and in which the holder 10 is not opposed to the inkjet head 200 in the Z-axis direction, via a position where the holder 10 is opposed to the inkjet head 200 in the Z-axis direction. The holder 10 in the present embodiment reciprocates in the X-axis direction along the rail 4. It should be noted that when two rails 4 are arranged in parallel to each other, and end portions of the individual rails 4 are coupled to each other to form an annular shape, the holder 10 circles the rails having the annular shape to move in only a single direction in some cases.

It should be noted that it is possible to mount the inkjet head 200 on the carriage to move the inkjet head 200 in the X-axis direction instead of the holder 10. In this case, it is sufficient to mount the holder 10 on the holder moving device which does not move in an X-Y plane direction, but moves so as to knock up the holder 10 in the Z-axis direction toward the inkjet head 200 which has moved riding on the carriage when performing the cleaning. According to this configuration, the cleaning operation can be changed between one from a single direction and one in both directions by the timing at which the holder 10 is knocked up in the Z-axis direction.

Further, the inkjet printer 1 is provided with a biasing member 5 for biasing the holder 10 toward the nozzle guard 210. The biasing member 5 is, for example, a spring or rubber, and is disposed between the holder 10 and the carriage 3. According to this configuration, it is possible to control the force for pressing the holder 10 against the nozzle guard 210. Therefore, it is possible to prevent an excessive force from being applied to the inkjet head 200 and the peripheral portion of the inkjet head 200.

As described above, the inkjet printer 1 according to the fourth modified example is provided with the cleaning device 100 for the inkjet head 200. According to this configuration, the cleaning of the inkjet head 200 can be automated or can be semi-automated. Further, similarly to the embodiment and the modified examples described above, even when the side surfaces of the inkjet head 200 are not exposed, and a part of the nozzle plate 201 fails to be exposed by the nozzle guard 210, it is possible to easily achieve the alignment with the inkjet head 200, and it is possible to clean the surfaces of the nozzle plate 201 and the nozzle guard 210, and the inside of the opening parts 213 of the nozzle guard 210 without injuring the nozzle plate 201.

Although the preferred embodiment of the present disclosure is hereinabove described, it should be understood that this is an illustrative description of the present disclosure, and should not be considered as a limitation. Modification such as addition, omission, and displacement can be implemented within the scope or the spirit of the present disclosure. Therefore, the present disclosure should not be assumed to be limited by the above description, but is limited by the appended claims.

For example, in the embodiment described above, the description is presented citing the inkjet head as an example of the liquid jet head, but this is not a limitation.

Further, as the inkjet head, it is possible to adopt a configuration (a so-called shuttle machine) in which the inkjet head moves with respect to the recording target medium when performing printing, or to adopt a configuration (a so-called fixed-head machine) in which the recording target medium is moved with respect to the inkjet head in the state in which the inkjet head is fixed.

In the embodiment described above, there is described when the recording target medium is paper, but this configuration is not a limitation. The recording target medium is not limited to paper, but can also be a metal material or a resin material, and can also be food or the like. Further, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiment described above, there is described the configuration in which the Z-axis direction coincides with the gravitational direction, but this configuration is not a limitation, and it is also possible for the Z-axis direction to be set along the horizontal direction, or to be set along any other directions than the gravitational direction.

What is claimed is:

1. A cleaning device for a liquid jet head comprising:

a holder which is configured to perform cleaning by moving relatively to the liquid jet head including a jet plate provided with a plurality of jet holes configured to jet a liquid, and a guard member which is configured to cover the jet plate, and is provided with an opening part shaped like an elongated hole configured to expose the plurality of jet holes, wherein the holder includes a jet section configured to jet a cleaning liquid toward at least one of the jet plate and the guard member, a contact part configured to make contact with a surface of the guard member provided with the opening part, and a protruding part which is inserted into the opening part in a non-contact state to the jet plate, and is configured to guide the holder along a longitudinal direction of the opening part.

2. The cleaning device for the liquid jet head according to claim 1, wherein the holder includes a recessed part configured to receive the cleaning liquid jetted by the jet section.

3. The cleaning device for the liquid jet head according to claim 2, wherein the holder includes a suction part disposed in the recessed part.

4. The cleaning device for the liquid jet head according to claim 3, wherein the holder includes a wall part which is erected from a bottom wall of the recessed part at a height no higher than an upper end of the recessed part, and which forms a space part surrounding the suction part.

5. The cleaning device for the liquid jet head according to claim 3, wherein the suction part is disposed at both sides across the jet section in the longitudinal direction of the opening part.

6. The cleaning device for the liquid jet head according to claim 2, wherein the contact part is formed to have a convex shape along an opening circumference edge portion of the recessed part.

7. The cleaning device for the liquid jet head according to claim 1, wherein a plurality of the protruding parts is disposed at intervals in the longitudinal direction of the opening part.

8. The cleaning device for the liquid jet head according to claim 7, wherein the jet section is disposed between the protruding parts adjacent to each other in the longitudinal direction of the opening part.

9. The cleaning device for the liquid jet head according to claim 1, wherein the jet section has a plurality of cleaning liquid jet holes, and at least one of the cleaning liquid jet holes is opposed to a jet area formed of the plurality of jet holes in a first state in which the protruding part has contact with a side surface at one side in a transverse direction of the opening part, a second state in which the protruding part has contact with a side surface at another side in the transverse direction of the opening part, and a third state in which the protruding part has contact with none of the side surfaces at both sides in the transverse direction of the opening part.

10. The cleaning device for the liquid jet head according to claim 1, wherein the jet section has a plurality of cleaning liquid jet holes, and at least one of the cleaning liquid jet holes is located at a first opposed position opposed to a jet hole located in an end portion at one side in the longitudinal direction of the opening part out of the plurality of jet holes, or one side in the longitudinal direction of the opening part with respect to the first opposed position in a fourth state in which the protruding part has contact with a side surface at the one side in the longitudinal direction of the opening part, and a second opposed position opposed to a jet hole located in an end portion at another side in the longitudinal direction of the opening part out of the plurality of jet holes, or another side in the longitudinal direction of the opening part with respect to the second opposed position in a fifth state in which the protruding part has contact with a side surface at the other side in the longitudinal direction of the opening part.

11. The cleaning device for the liquid jet head according to claim 1, wherein the protruding part includes a depressed part formed on an upper end surface of the protruding part, and a protruding part cleaning liquid jet hole formed in the depressed part.

12. The cleaning device for the liquid jet head according to claim 1, wherein a plurality of the opening parts is formed at intervals in a transverse direction of the opening parts, and the protruding parts are disposed as a pair at such an interval that the protruding parts are inserted into two opening parts formed at a unique interval out of the plurality of opening parts.

13. The cleaning device for the liquid jet head according to claim 12, wherein the protruding parts are disposed as a pair at such an interval that the protruding parts are inserted into two opening parts located in both end portions in the transverse direction of the opening parts out of the plurality of opening parts.

14. A liquid jet recording apparatus comprising:

the cleaning device for the liquid jet head according to claim 1.

* * * * *